United States Patent [19]

Moyer et al.

[11] Patent Number: 5,726,663
[45] Date of Patent: Mar. 10, 1998

[54] SURVIVAL RADIO INTERROGATOR

[75] Inventors: Christopher Kent Moyer; David Moon Yee, both of Scottsdale, Ariz.

[73] Assignee: Motorola, Inc., Schaumburg, Ill.

[21] Appl. No.: 734,989

[22] Filed: Oct. 22, 1996

[51] Int. Cl.$^6$ .................................................. G01S 5/02
[52] U.S. Cl. .................... 342/419; 342/357; 342/386; 364/449.7
[58] Field of Search ........................ 342/357, 386, 342/419, 417; 364/445.7

[56] References Cited

U.S. PATENT DOCUMENTS

| | | | |
|---|---|---|---|
| 5,365,451 | 11/1994 | Wang et al. | 364/449 |
| 5,389,934 | 2/1995 | Kass | 342/357 |
| 5,414,432 | 5/1995 | Penny et al. | 342/357 |
| 5,438,321 | 8/1995 | Bernard et al. | 340/573 |
| 5,515,419 | 5/1996 | Sheffer | 379/58 |
| 5,517,199 | 5/1996 | DiMattei | 342/357 |

Primary Examiner—Thomas H. Tarcza
Assistant Examiner—Dao L. Phan
Attorney, Agent, or Firm—Frank J. Bogacz

[57] ABSTRACT

Survival radio interrogator (1) transmits upon request a message including an identification of survival radio (3). Upon receiving and processing this message, survival radio (3) determines its position from the Global Positioning System and transmits a message back to the search aircraft (2) with the survival radio interrogator (1). The processor (10) of the survival radio interrogator 1 determines a range and bearing of the survival radio (3) and processes data from the survival radio 3 which data includes identification, position and messaging information for display on the LCD display 14. All message transmissions are conducted via the aircraft's (2) radio/intercom system (30).

17 Claims, 1 Drawing Sheet

SURVIVAL RADIO INTERROGATOR

BACKGROUND OF THE INVENTION

The present invention pertains to radios and more particularly to search and rescue radios for radio interrogation.

When a search and rescue operation is required, as for a downed airplane or helicopter pilot for example, search and rescue radio system interrogators are typically employed. Such search and rescue radio systems include a small portable radio which is in the possession of the downed pilot. These radios include the AN/PRC-112. Such systems further include an interrogator which is carried in the rescue aircraft (helicopter or plane).

The important information required by the search and rescue aircraft is the correct identity of the survival radio and the position of the radio and associated downed pilot. The Global Positioning System (GPS) is particularly useful for determining position. Survival radios have been known to have GPS receivers capable of self determination of position.

The search and rescue interrogators are typically suitcase sized and include a GPS receiver, portable computer, LST-5 radio, battery, power supply, etc. and weigh approximately 60 pounds. This suitcase interrogator is also very expensive.

It would be advantageous to have a small, lightweight and inexpensive radio interrogator for use in search and rescue operations.

DESCRIPTION OF THE PREFERRED EMBODIMENT

Figure 1:
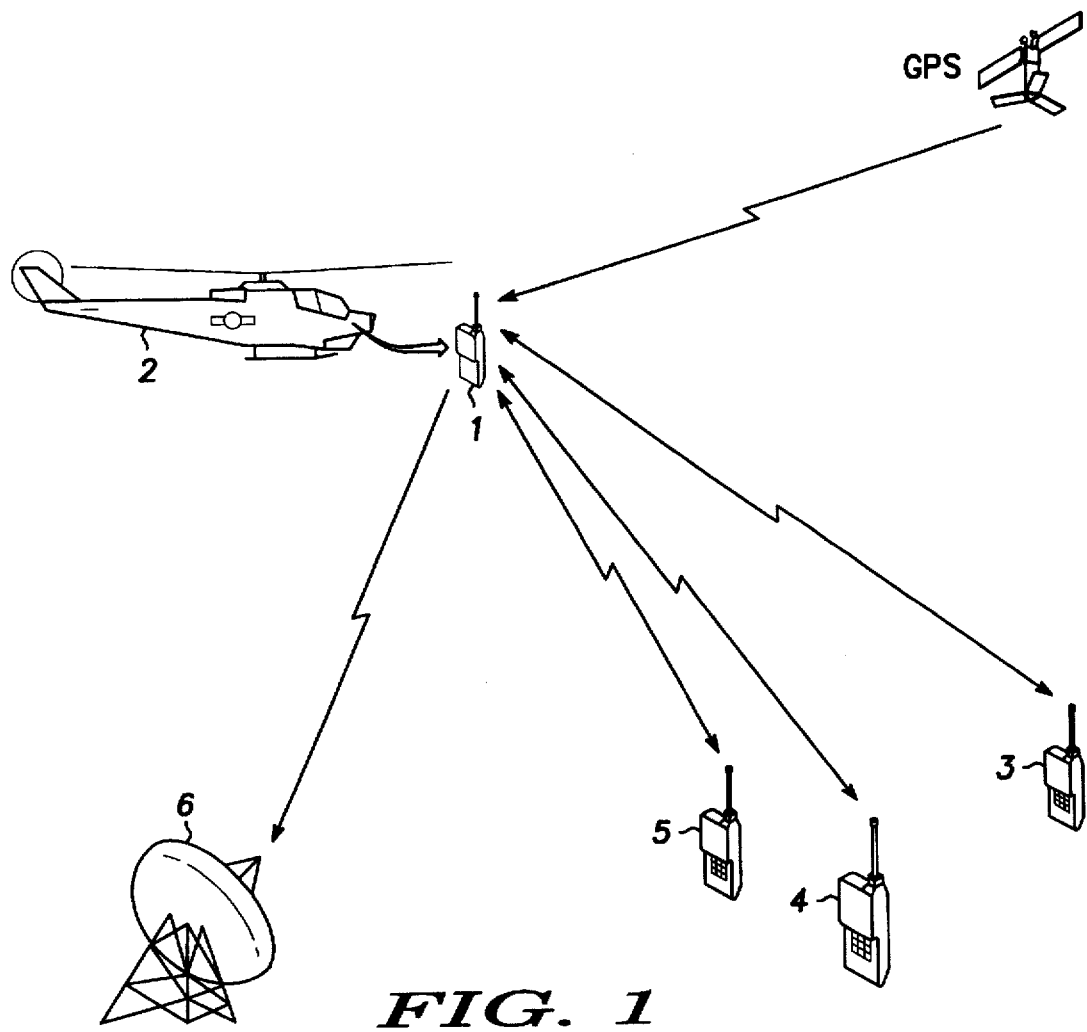
FIG. 1 is a block diagram of a search and rescue operation in accordance with the present invention.

FIG. 1 depicts a search and rescue operation scenario where the handheld radio interrogator 1 is used. Handheld radio interrogator 1 is held and operated by one of the search and rescue helicopter 2 occupants (not shown). Handheld radio interrogator 1 is connected to the helicopter 2 radio system (not shown). Handheld radio interrogator 1 transmits a signal to interrogate any PRC-112 type survival radio with GPS capability (3,4,5) on the ground.

Each PRC-112 radio (3–5) has a unique identification number which the handheld radio interrogator 1 is programmed to interrogate. When the handheld radio interrogator 1 receives a response from one or more of the survival radios (3–5), for example radio 3, the occupant of the helicopter 2 can determine a range and bearing from the position of the helicopter 2 to radio 3. Radio 3 is in the possession of the downed pilot or aircraft personnel.

When searching for a downed pilot, the interrogator 1 is triggered and a GPS compatible message is transmitted to survival radio 3. The radio system of the search and rescue aircraft handles the transmission of the message to the survival radio 3. When the interrogator 1 receives a response from radio 3, a message including an identification number, GPS position of the radio and status is obtained. From this information the interrogator 1 can quickly determine the range and bearing of the radio 3 once the aircraft's position is known.

The handheld radio interrogator 1 can also relay Global Positioning System (GPS) information and messaging information to another location such as receiver 6. Receiver 6 may be located on the ground, for example. The GPS location information of the radio 3 may be accomplished by the handheld radio interrogator 1 using the existing radio and antenna (not shown) of helicopter 2.

The handheld interrogator 1 functions as the avionics radio interrogator and simply plugs into the aircraft (helicopter 2) intercom/radio system. Interrogator 1 includes a microprocessor and an MSK (Minimum Shift Keying) modem and is capable of baseband transmitting and receiving GPS radio messages (i.e. location and messaging information of the downed pilot) from the PRC-112 radio.

The handheld interrogator 1 is used to communicate with PRC-112 survival radios (3–5) with embedded GPS capability. The GPS capability means the ability to self determine position through the use of the GPS constellation of satellites for that purpose.

Figure 2:
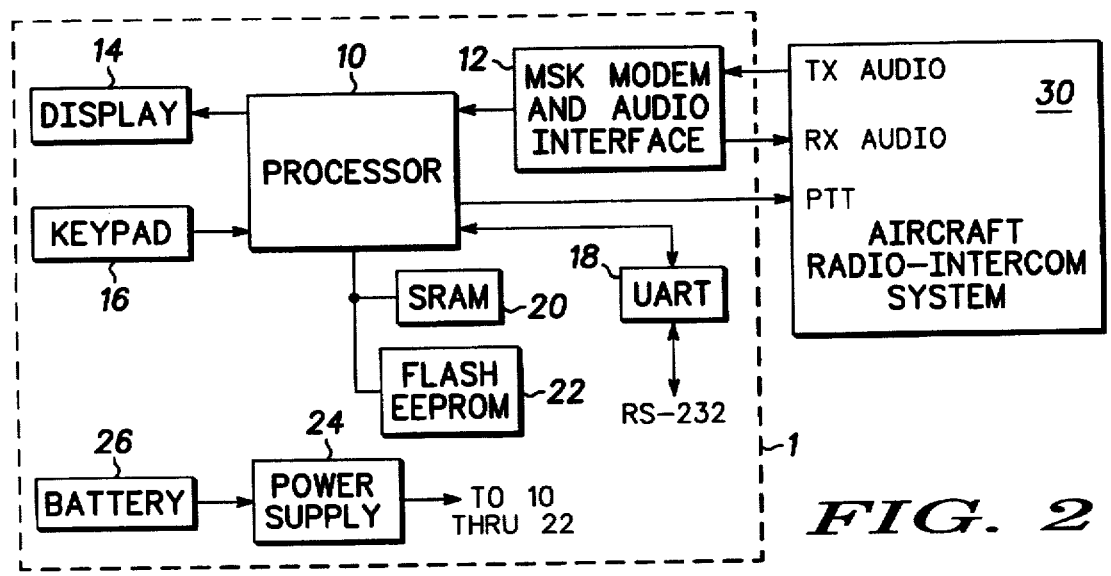
FIG. 2 is a block diagram of a handheld survival radio interrogator in accordance with the present invention.

Referring to FIG. 2, a block diagram of the handheld interrogator 1 is shown. Processor 10 is the heart of the handheld interrogator 1. Processor 10 executes a program instruction set and interfaces to the external interfaces such as keypad 16, display 14, aircraft radio/intercom 30, the PTT (Push To Talk) control, MSK Modem 12 and RS-232 port UART 18 (Universal Asynchronous Receiver Transmitter). Processor 10 may be implemented with a MC68331 Motorola microprocessor, for example.

Display 14 may be a LCD (Liquid Crystal Display) device. Display 14 may be a 4×20 character display which displays parameters such as identification number, encryption key status, an outgoing message and data received from a PRC-112 survival radio such as identification number, position, time and any message.

Keypad 16 is a part of the user/machine interface. Keypad 16 may be a multi-button keypad which provides input data as mentioned above for the display. Keypad 16 may be used to scroll through menus and received data from the PRC-112 survival radio. An additional button is used to initiate the "interrogate" function. For convenience this button may be located on the side of the interrogator (or other convenient location).

SRAM 20 (Static Random Access Memory) stores temporary data during operation of the interrogator 1. Data stored includes such data as identification codes of the PRC-112 survival radio, received data from the survival radio and set up configuration for the interrogator 1.

Flash EEPROM 22 stores the executable programs of the interrogator 1. EEPROM 22 can be reloaded with new operation instructions if necessary by using the UART 18 as an RS-232 port.

UART 18 is the digital receiver and transmitter which supports the RS-232 interface. The UART 18 is connected to the processor 10 and converts parallel data from processor 10 to serial data to meet the RS-232 standard. The RS-232 interface is used primarily for programming and upgrading the executable software in the interrogator 1.

MSK modem 12 creates the MSK tones from the digital data stream on TxAudio from the microprocessor 10 and also converts the received MSK tones on RxAudio from the aircraft radio/intercom system 30 to digital data to be sent to the microprocessor 10. The MSK modem is buffered and level controlled via audio circuitry which provides the interface to the aircraft radio/intercom system 30 and user's headset (not shown).

Power supply 24 supplies to particular voltages required for operation of each of the functional units 10–22 of the interrogator 1. Power supply 24 is operated by battery 26. Battery 26 may be powered by four AA batteries, for example, which can power all functions of the interrogator for approximately 10 hours.

Referring to FIGS. 1 and 2 when searching for a downed pilot, the button for initiating the "interrogate" function is triggered on the interrogator 1. Interrogator formats a PRC-112 survival radio (GPS compatible) message through processor 10 and sends the message through MSK modem 12 to the aircraft radio/intercom system 30 via the TxAudio lead. The radio/intercom system 30 handles the transmission of the message to the survival radios (3–5). Thereby reducing the overhead and required hardware of the handheld interrogator 1. Interrogation is made for a specific survival radio 3, for example.

When the interrogator 1 receives a response from radio 3, a message including an identification number, position of the radio 3 and status is obtained. From this information the interrogator 1 can quickly determine the range and bearing of the radio 3 once the aircraft's position is known. The downed pilot may then be recovered or position may be passed onto another receiver system 6 for subsequent dispatch of other aircraft and pick up of the downed pilot.

In order to provide for integrity of the messages sent by interrogator 1 to radio 3 and from radio 3 to interrogator 1, two methods for data integrity are employed. These two methods are bit interleaving and forward error correction.

Bit interleaving is used to distribute errors that are introduced due to bursts of noise interference that exist for durations of more than one bit. It is assumed that during a message only a few noise bursts occur.

Forward Error Correction (FEC), is used to detect and correct random bit errors. Numerous classes of random error correcting codes exist, but a preferred one which is extensive and powerful one is the Bose, Chaudhuri and Hocquenghem, (BCH) class. This technique adds additional bits to a block of data bits which then allows both detection and correction of subset of bit errors in a given data block.

A GPS receiver link may be added to the handheld radio interrogator 1. The GPS link would provide the location of the interrogator 1 and associated helicopter 2. This will allow for automatic way-point navigation from the search and rescue helicopter 2 to the survival radio 3 of a downed pilot.

A major improvement of the present invention is that the combination of the processor 10 and MSK modem 12 perform in a handheld interrogator GPS interrogation function of an avionics interrogator while using the radio intercom system including antenna already existing in the search aircraft. Thereby a handheld, inexpensive interrogator is possible.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A survival radio interrogator for use with a radio system of a search aircraft to locate a survival radio, said survival radio interrogator comprising:

a processor;

said processor generating a first message for transmission to said survival radio, a first message including an identification number of said survival radio and a request for position information of said survival radio;

said survival radio interrogator for finding a particular survival radio with said first message;

a modem coupled to said processor, said modem for transmitting and receiving messages;

said modem further coupled to said radio system, said modem transmitting said messages through said radio system to said particular survival radio and said modem receiving a second messages through said radio system from said particular survival radio; and said processor for analyzing said second message received from said particular survival radio to determine an identification number of said particular survival radio, a global positioning system position of said particular survival radio relative to said search aircraft and status information of said particular survival radio.

2. A survival radio interrogator as claimed in claim 1, wherein said survival radio interrogator includes a handheld survival radio interrogator.

3. A survival radio interrogator as claimed in claim 1, wherein said processor includes a microprocessor.

4. A survival radio interrogator as claimed in claim 1, wherein said modem includes a minimum shift key (MSK) modem.

5. A survival radio interrogator as claimed in claim 1, wherein said processor is further coupled to said radio system, said processor controlling a push-to-talk function of the radio system for transmitting of said messages.

6. A survival radio interrogator as claimed in claim 1, wherein there is further included a universal asynchronous receiver/transmitter coupled to said processor, said universal asynchronous receiver/transmitter for providing an RS-232 interface to said processor.

7. A survival radio interrogator as claimed in claim 1, wherein there is further included random access memory coupled to said processor, said random access memory for temporarily storing data.

8. A survival radio interrogator as claimed in claim 1, wherein there is further included read only memory coupled to said processor, said read only memory for storing operating instructions for said processor.

9. A survival radio interrogator as claimed in claim 1, wherein there is further included a display for visually depicting said messages, said display coupled to said processor.

10. A survival radio interrogator as claimed in claim 9, wherein said display further includes a liquid crystal display.

11. A survival radio interrogator as claimed in claim 1, wherein there is further included a keypad coupled to said processor, said keypad for inputting information to said processor.

12. A survival radio interrogator as claimed in claim 1, wherein there is further included a power supply and a voltage source coupled to said power supply, said power supply for providing power for said survival radio interrogator.

13. A survival radio interrogator as claimed in claim 1, wherein said survival radio includes a global positioning system compatible survival radio for providing GPS information of a position of said survival radio.

14. A survival radio interrogator as claimed in claim 1, wherein said processor is further coupled to said radio system to transmit a position message to a remotely located receiver.

15. A survival radio interrogator as claimed in claim 1, wherein said survival radio interrogator further includes a global positioning system link for providing way-point navigation information to locate said survival radio.

16. A survival radio interrogator as claimed in claim 1, wherein said processor formats said first message and receives said second message with supplementary bits to support a bit interleaving noise reduction scheme.

17. A survival radio interrogator as claimed in claim 1, wherein said processor formats said first message and receives said second message with supplementary bits to support a forward error correction scheme.

* * * * *